Feb. 25, 1936. H. H. LUCKER 2,032,024
BEER KEG AND DISPENSING MECHANISM.
Filed June 1, 1934

Inventor
Hubert H. Lucker
By Bacon & Thomas
Attorneys

Patented Feb. 25, 1936

2,032,024

UNITED STATES PATENT OFFICE 2,032,024

BEER KEG AND DISPENSING MECHANISM

Hubert H. Lucker, Detroit, Mich.

Application June 1, 1934, Serial No. 728,585

6 Claims. (Cl. 225—1)

This invention relates to new and useful improvements in beer kegs and means employed for dispensing the contents of the same.

The primary object of this invention is to provide a beer keg which will meet with all the Government requirements imposed on such articles.

A further important object of the invention is to provide a beer keg having means for controllably dispensing the contents of the same with means for receiving a revenue stamp which will prevent the actuation of the beer dispensing mechanism without effecting cancellation or perforation of said stamp.

A further object of the invention is to provide a beer keg having dispensing means which includes a valve operating handle and a dispensing spout with means for sealing or restraining movement of the said handle and spout against unauthorized use.

Other objects and advantages of the invention will be apparent during the course of the following description.

Figure 1:
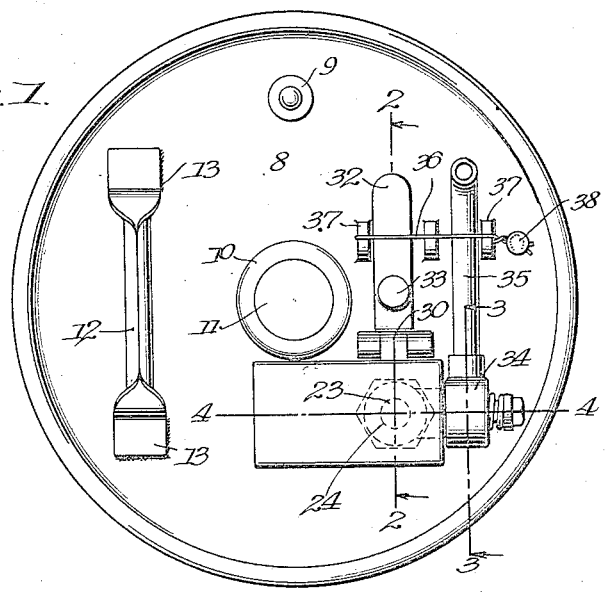
Figure 2:
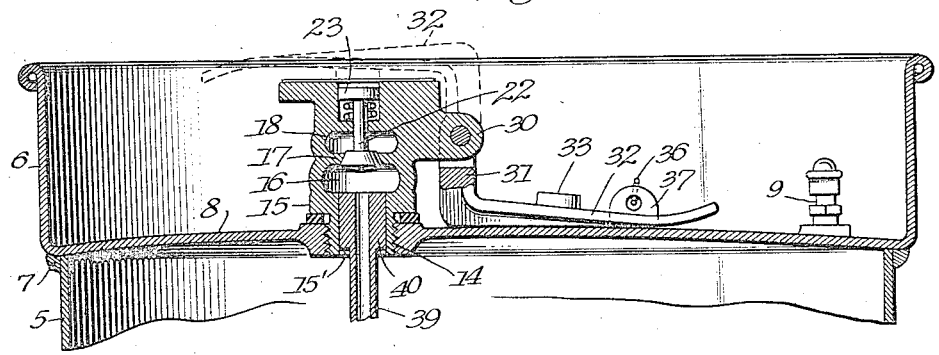
Figure 3:
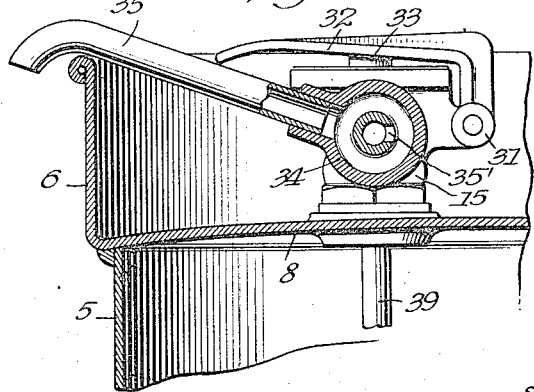
Figure 4:
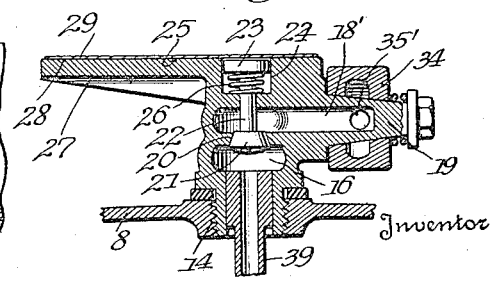

In the accompanying drawing forming a part of this specification and in which like numerals are employed to designate like parts throughout the same, Figure 1 is a top plan view of a beer keg with the improved dispensing mechanism embodying this invention operatively associated therewith, Fig. 2 is a vertical sectional view taken on line 2—2 of Fig. 1, Fig. 3 is a vertical sectional view taken on line 3—3 of Fig. 1, and Fig. 4 is a vertical sectional view taken on line 4—4 of Fig. 1.

In the drawing wherein for the purpose of illustration is shown a preferred embodiment of this invention, the numeral 5 designates in its entirety the side wall portion of a beer keg which is made of any suitable metal and has its ends closed by dished or cupped heads, also formed of metal. To properly disclose this invention, it has only been necessary to illustrate one of the cupped or dished heads and this is designated by the reference character 6. A suitable connection is provided between the wall 5 of the keg and the head 6, such as by welding at 7. The base or bottom wall 8 of the head 6 has suitably connected thereto a check valve structure 9 which may take the form of an ordinary tire valve and is employed for permitting air to be compressed in the keg to place the contents of the latter under pressure. Fig. 1 discloses a bung hole 10 which is adapted to have driven therein a suitable wooden plug or bung 11.

A handle, offset with respect to the longitudinal axis of the keg is secured to the bottom surface or wall 8 of the head. This handle is formed of strap material and includes the intermediate, rolled grip portion 12 and the flat securing feet 13.

Figs. 2 to 4 inclusive, disclose the bottom 8 of the head as having an internally threaded aperture 14 formed therein to which is threadedly connected a valve casing 15. This casing is formed with an inner chamber 16 which is always in communication with the interior of the keg through the hollow base portion 15' of the valve casing. Separated from the chamber 16 by a partition 17 is a second chamber 18 which is elongated to provide a branch 18' extending into a stem-like mounting 19 which is formed integral with the casing. A valve port 20 is formed in the partition 17 and is provided with a conical seating surface to be engaged by the valve 21. This valve is formed with a stem 22 which terminates in a head 23 formed in a pocket 24 which opens through the top surface 25 of the valve casing. A spring 26 encircles the valve stem 21 and engages at its opposite ends the inner face of the valve stem head 23 and the bottom wall of the pocket 24. This spring functions to retain the valve 21 on its seat.

The valve casing is formed with a shelf-like enlargement 27. One surface 28 of this enlargement is coextensive with the top surface 25 of the main portion of the valve body and these two surfaces 25 and 28 are designed to have secured thereto a revenue stamp 29. It will be noted that this stamp will close or bridge the mouth of the pocket 24 which receives the valve stem head 23. It will be impossible to operate the valve, by depressing the head, without first canceling or perforating the revenue stamp 29.

Projecting laterally from one side of the main body of the valve casing is an apertured ear 30 which has pivoted thereto the bifurcated end 31 of an L-shaped operating handle 32. This handle is formed with a protuberance or projection 33 which will register with the open end of the pocket 24 when the handle is moved into the valve operating position as shown by dash lines in Fig. 2 and full lines in Fig. 3. This protuberance or projection 33 will cooperate with the edge of the pocket 24 to shear or cut out a portion of the stamp 29 which will correspond in size and shape with the pocket 24.

The stem-like mounting 19 has a tapered outer surface which is adapted to have pivoted thereto the hollow hub 34 of a discharge nozzle 35. The bore of this hollow hub 34 communicates with the chamber extension 18' of the valve casing through the port 35' so that the nozzle will always be in communication with the chamber extension 18' during all positions of the nozzle.

Fig. 1 discloses the nozzle 35 and the valve operating handle 32 in their inoperative positions in contact with the bottom wall 8 of the head 6 of the keg. When in these inoperative positions, the valve handle and the nozzle may be restrained against movement into operative positions by a wire 36 which is passed through the apertures of three ears 37 and has its ends connected by a seal 38. This wire and the seal will prevent unauthorized or undetected use of the nozzle and valve operating handle. Fig. 3 discloses the nozzle 35 arranged in its operative position with the extremity of the same projecting beyond the side wall of the head 6. By inspecting Figs. 2 and 3, it will be seen that when the valve handle 32 and the nozzle 35 are arranged in their inoperative positions, no portion of the dispensing mechanism will project beyond or above the upper edge of the head 6.

For the purpose of conducting the beer from the interior of the keg to the inner chamber 16 of the valve casing, a tube 39 extends into the keg and should terminate adjacent the opposite head of the keg. The connection between this stem 39 and the valve casing 15 is provided by the enlarged head 40 of the stem which tightly fits in the bore of the threaded stem of the valve casing.

It is to be understood that the form of this invention herewith shown and described is to be taken as a preferred example of the same, and that various changes in the shape, size and arrangement of parts may be resorted to without departing from the spirit of the invention or the scope of the subjoined claims.

Having thus described the invention, I claim:

1. In a device of the type described, a keg, said keg having an opening, a valve casing mounted in said opening, a spring-pressed valve in the casing having an actuating stem terminating substantially at the surface of the casing, said casing surface being of sufficient size to permit a revenue stamp to be applied thereto so as to cover the end of the valve stem, and a valve actuator pivotally connected to the casing and constructed and arranged to cancel or perforate the stamp when brought to bear against the valve stem.

2. A device of the type described comprising a keg having an opening in one end thereof, a valve casing mounted in said opening, said casing having formed thereon a surface constructed and arranged to have a revenue stamp applied thereto, a pocket formed in the casing opening through said surface, a valve mounted in the casing and having an actuating stem terminating in said pocket, and a valve actuator pivotally mounted on the casing and movable to perforate the stamp prior to engaging the valve stem.

3. A device of the type described comprising a keg having an opening in one end thereof, a valve casing mounted in said opening, said casing having formed thereon a surface constructed and arranged to have a revenue stamp applied thereto, a pocket formed in the casing opening through said surface, a valve mounted in the casing and having an actuating stem terminating in said pocket, and a valve actuator pivotally mounted on the casing and having a valve stem engaging projection adapted to cooperate with the edge of said surface pocket to perforate the revenue stamp prior to contacting with the valve stem.

4. A device of the type described comprising a keg having an opening, a valve casing mounted in said opening, a spring-pressed valve in the casing having an actuated stem terminating at one surface of the casing, an angular valve operating handle pivotally connected to the casing and having a projection adapted to engage the valve stem to actuate the valve, said valve actuating arm being adapted to be moved into an inoperative position against a wall of the keg, and means for retaining the said arm in its inoperative position.

5. A device of the type described comprising a keg having a dished head, dispensing mechanism mounted on said head and terminating at its outer end inwardly of the outer edge of said head, a spring-pressed valve mounted in the valve casing and having an actuated stem terminating at the top surface of the valve casing, a valve actuating arm of angular formation pivoted to the casing and movable between an inoperative position extending laterally of the valve casing and an operative position overlying the valve casing, and means for retaining the actuating arm in its inoperative position.

6. A device of the type described comprising a keg having an opening, a valve casing mounted in said opening, a valve in said casing, a valve operating arm pivotally mounted on the casing, a discharge nozzle pivotally connected to the casing, said valve operating arm and said nozzle being movable into positions in engagement with the keg, and means for receiving a wire and seal positioned to retain the said arm and nozzle in said latter positions against unauthorized movement.

HUBERT H. LUCKER.